No. 773,386. PATENTED OCT. 25, 1904.
W. H. FUQUA.
POLE HOLDER.
APPLICATION FILED FEB. 25, 1904.
NO MODEL.
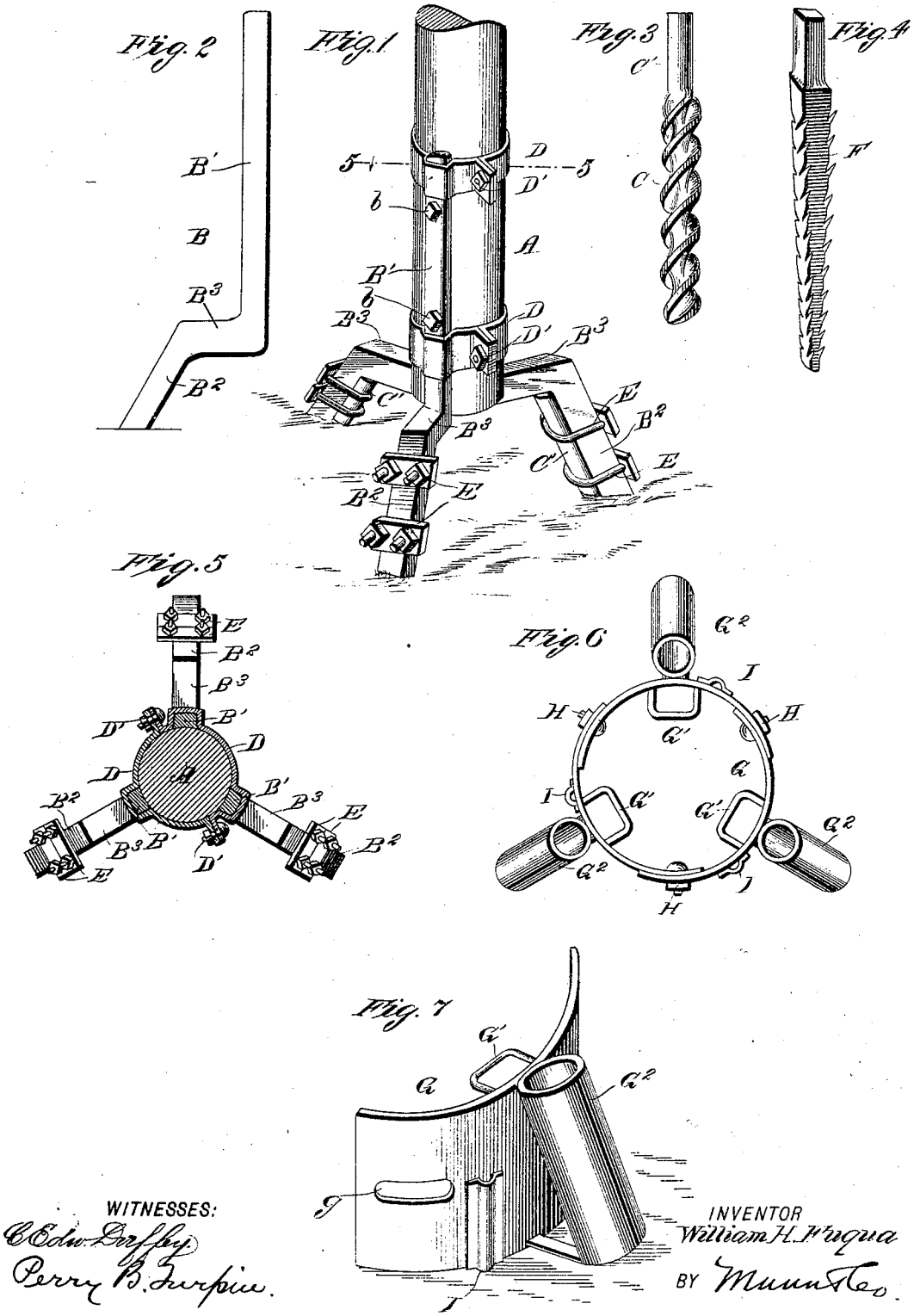
WITNESSES:
INVENTOR
William H. Fuqua
BY Munn & Co.
ATTORNEYS No. 773,386.           Patented October 25, 1904.

UNITED STATES PATENT OFFICE.

WILLIAM H. FUQUA, OF ROSWELL, TERRITORY OF NEW MEXICO.

POLE-HOLDER.

SPECIFICATION forming part of Letters Patent No. 773,386, dated October 25, 1904.

Application filed February 25, 1904. Serial No. 195,212. (No model.)

*To all whom it may concern:*

Be it known that I, WILLIAM H. FUQUA, a citizen of the United States, residing at Roswell, in the county of Claves and Territory of New Mexico, have made certain new and useful Improvements in Pole-Holders, of which the following is a specification.

My invention is an improvement in pole-holding apparatus especially intended for holding heavy poles, such as telegraph, telephone, and other poles; and the invention consists in certain novel constructions and combinations of parts, as will be hereinafter described and claimed.

In the drawings, Figure 1 is a perspective view of my improved holder as in use. Fig. 2 is a detail side view of one of the stand-sections. Fig. 3 is a side view of the screw-stake. Fig. 4 is a detail perspective view of the barbed stake. Fig. 5 is a cross-sectional view on about line 5 5 of Fig. 1. Fig. 6 is a top plan view of the gage, and Fig. 7 is a detail perspective view of one of the gage-sections.

In the accompanying drawings the pole A is shown secured to and supported by the stand-sections B, one of which is shown in detail in Fig. 2 and is formed with the upright top section B' to lap alongside the pole A, the inclined or outwardly-flaring foot portion B² to rest upon the ground and to be secured to the stakes C and the intermediate lateral pole B³ connecting the upper end of the foot portion B² with the lower end of the lap portion B', as shown in Figs. 1 and 2 of the drawings. The lap portions B' lap against the pole A, are bolted thereto at $b$, and are secured in connection therewith by the clamps D, which encircle the pole and lap portions B' of the stand-sections and are bolted tightly together at D', thus coöperating with the bolts $b$ in securing the lower end of the pole securely in connection with the stand-sections B, as will be understood from Figs. 1 and 5 of the drawings. The outwardly-inclined foot portions B² rest upon the ground and are secured to the upper ends C' of the stakes C, which latter are driven into the ground and are firmly held at their upper ends to the foot portions B² of the stand-sections B by means of the clips E, as shown in Figs. 1 and 5.

As shown in Fig. 3, the stakes C are made in the form of screws; but in case of shell, rock, roots, or elsewhere where screws cannot be used a bearded bar F, such as shown in Fig. 4, may be driven in place of the screws.

In practice I prefer to arrange the stakes at an angle of about twenty-two degrees, and in setting the said stakes I prefer to employ a gage, such as illustrated in Figs. 6 and 7, and consisting of a plurality of segmental sections G, provided on their inner sides with projections G' to gage the distance between the pole and top end of stake when the latter is set. These segments G are provided on their outer sides with guide-tubes G² at the proper angle for the stakes C and adapted to permit the stakes to be driven through them into the ground, and the segments G are adjustably connected by bolts H passing through slots $g$ in the segments, so the gage can be made larger or smaller, as desired. Each of the segments is provided on its outer side with loops I, through which pins may be driven into the earth to hold the gage in place.

In operation the gage may be adjusted and set to the place where it is desired to support the pole and the stakes be set in the ground by driving them through the guide-tubes G². Two of the stand sections or arms B may then be secured to their respective stakes and held rigidly thereto by two clevises or clips to each stake, the upper end of the stake being plain and adapted to be secured by the clevises, as shown in Fig. 1. The pole may then be set up against the lap-sections B' of the two stands and fastened by screws $b$, passing through the portions B' into the pole. The third arm may then be adjusted in like manner and secured to the stake and to the pole, after which the bands may be applied and securely bolted up around the stand-sections of the pole, as shown in Fig. 1. As shown, the bands D are in two sections, (see Fig. 5,) with the opposite end of the sections bolted together at D'.

To apply the invention to telegraph-poles already in the ground the gage or die may be placed around the pole, the stakes be driven in the earth, and the operation proceed as before.

Ordinarily the lap portions B' of the stakes are made about four feet in length, with the lateral band B³ at a right angle and of sufficient length to allow of an angle of twenty-two degrees to the screw without the latter coming into contact with the pole, the inclined foot portions B² being arranged at an angle of twenty-two degrees and being about one foot in length, the foot portions B² agreeing in angle and length with the smooth upper portions of the stakes C or F. The stakes are usually about three feet in length and four inches in diameter and may be in the form of screws, as shown in Fig. 3, or barbed, as shown in Fig. 4, as before referred to. In practice it is found that the holding power of the improved device is greater than that of the pole itself, as it has a greater face-bearing in the earth, the angle at twenty-two degrees assisting in the bracing action, as will be understood from the drawings.

In practice a pole can be set quicker than in the ordinary way, and in case a pole is crooked or bent in any way small wedges may be interposed between the sections B' and the pole to tilt the pole as may be required.

In practice the pole is elevated about one foot from the ground, so that a pole which may be decayed in the ground is for many respects as good as a new one, and in applying the improvement to a pole already in the ground the latter will not have to be moved in any way, it only being necessary to apply the holder to the said pole, as will be understood from Fig. 1 of the drawings.

Ordinarily in practice the improvement may be made entirely of steel and iron.

Having thus described my invention, what I claim as new, and desire to secure by Letters Patent, is—

1. A pole-holder comprising a plurality of stand-sections each having an upper lap portion to fit alongside of the pole, a lateral outwardly-extending portion at the lower end of the lap portion, and an inclined foot portion extending outwardly and downwardly from the outer end of the lateral portion, the bands to encircle the lap portions and a pole fitted between the same, the stakes driven into the ground at an angle and lapped at their upper ends against the inclined foot portions of the stand-sections and secured at such ends to the foot portions of the stand-section, substantially as and for the purposes set forth.

2. A post-holder comprising a plurality of stand-sections having upper portions to lap alongside a pole, outwardly-extending lateral portions projecting from the lower ends of the lap portions, inclined foot portions inclining downwardly and outwardly from the lateral ends of the lateral portions, the stakes driven into the ground at an angle approximating twenty-two degrees, and means for securing the upper ends of the stakes to the inclined foot portions of the stand-sections, and means for securing the lapped portions of the stand-sections to a post fitted between the same, substantially as set forth.

3. The combination with a post and stand-sections having upright portions lapped against and secured to the post, and outwardly-inclined foot portions to rest upon the ground, of stakes arranged at an angle corresponding to that of the foot portions and secured at their upper ends to said foot portions, substantially as set forth.

4. A pole-holder comprising a plurality of stand-sections having upright portions to lap against a pole, lateral portions at the lower ends of the said lap portions, and lower inclined foot portions, stakes and means for securing the stakes at their upper ends to the inclined foot portions, and means for securing the upper lap portions to a pole fitted between the same, substantially as set forth.

5. A gage comprising a plurality of segmental sections adjustably connected and inclined guide-tubes on said sections, substantially as set forth.

6. A gage for pole-holders, consisting of a plurality of segmental sections having inwardly-projecting gage portions, guide-tubes arranged at an incline on the outer side of said segmental sections, and means for connecting the sections, substantially as set forth.

WILLIAM H. FUQUA.

Witnesses:
MARK HOWELL,
J. A. GILMORE.